Jan. 16, 1940.  A. E. DRISSNER  2,187,681
FORMING OR CROSS SLIDE MECHANISM FOR AUTOMATIC METALWORKING MACHINES
Filed Sept. 8, 1937  2 Sheets-Sheet 1

INVENTOR.
Alfred E. Drissner
BY
ATTORNEY.

Jan. 16, 1940. A. E. DRISSNER 2,187,681
FORMING OR CROSS SLIDE MECHANISM FOR AUTOMATIC METALWORKING MACHINES
Filed Sept. 8, 1937 2 Sheets-Sheet 2
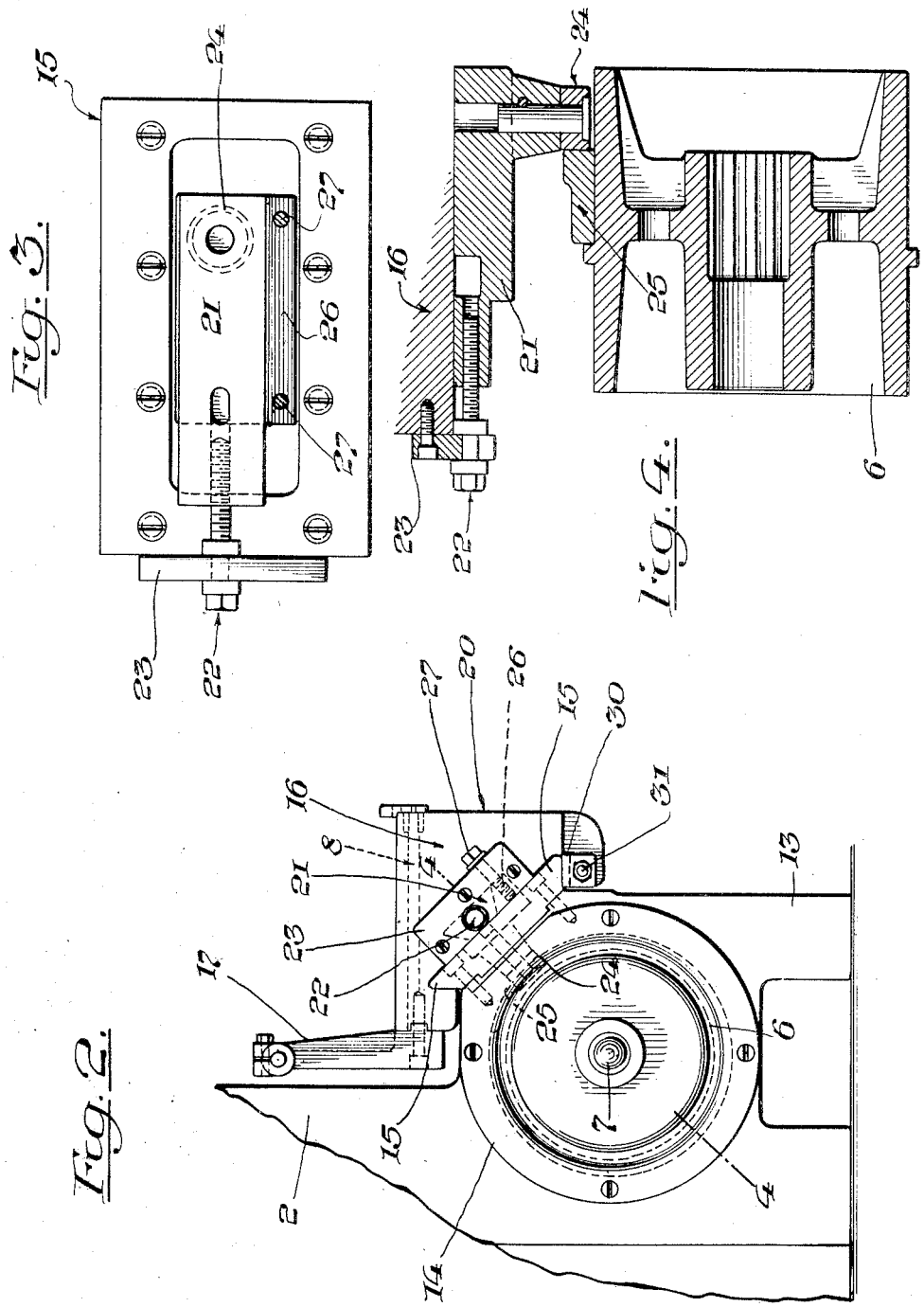
INVENTOR.
Alfred E. Drissner
BY
ATTORNEY.

Patented Jan. 16, 1940

2,187,681

UNITED STATES PATENT OFFICE 2,187,681

FORMING OR CROSS SLIDE MECHANISM FOR AUTOMATIC METALWORKING MACHINES

Alfred E. Drissner, Cleveland, Ohio, assignor to The National Acme Company, Cleveland, Ohio, a corporation of Ohio Application September 8, 1937, Serial No. 162,846

30 Claims. (Cl. 29—37)

This invention relates to forming or cross slide mechanism for automatic metal working machines of the single or multiple spindle type, chucking and bar machines, the object of the invention being to provide improved forming or cross slide mechanism that will permit the use of wider cross slides and at the same time increase the chip room between the housings of the machine, the present invention being an improvement upon that shown and described in the Simpson and Drissner Patent No. 2,033,490, of March 10, 1936.

In modern machines, especially with the increased speed thereof, and which use the new type of cutting tools, the chip room, for instance, in multiple spindle machines, between the housings carrying the indexible work spindle carrier and the gear unit is a very important factor, it having heretofore been difficult to provide sufficient room between these housings to accommodate the chips resulting from the high rate of production of the machines. Not only this, it is necessary, in many instances, to provide wider forming slides to accommodate combination tools used on different classes of work and these advantages are obtained in the present improvement wherein it is practicable to provide wider forming slides and at the same time increase the chip room between the housings as compared with that shown in the patent referred to.

In the drawings accompanying and forming a part of this specification, Fig. 1 is a partly cross sectional view of a machine similar to that shown in the patent referred to and illustrating the opposed forming or cross slides.

Fig. 2 is an end view of one of the forming or cross side mechanisms.

Fig. 3 is a detail top view of one part of one of the cross slides, and

Fig. 4 is a sectional view taken on line 4—4 of Fig. 2.

Similar characters of reference indicate corresponding parts in the several views.

Figure 1:
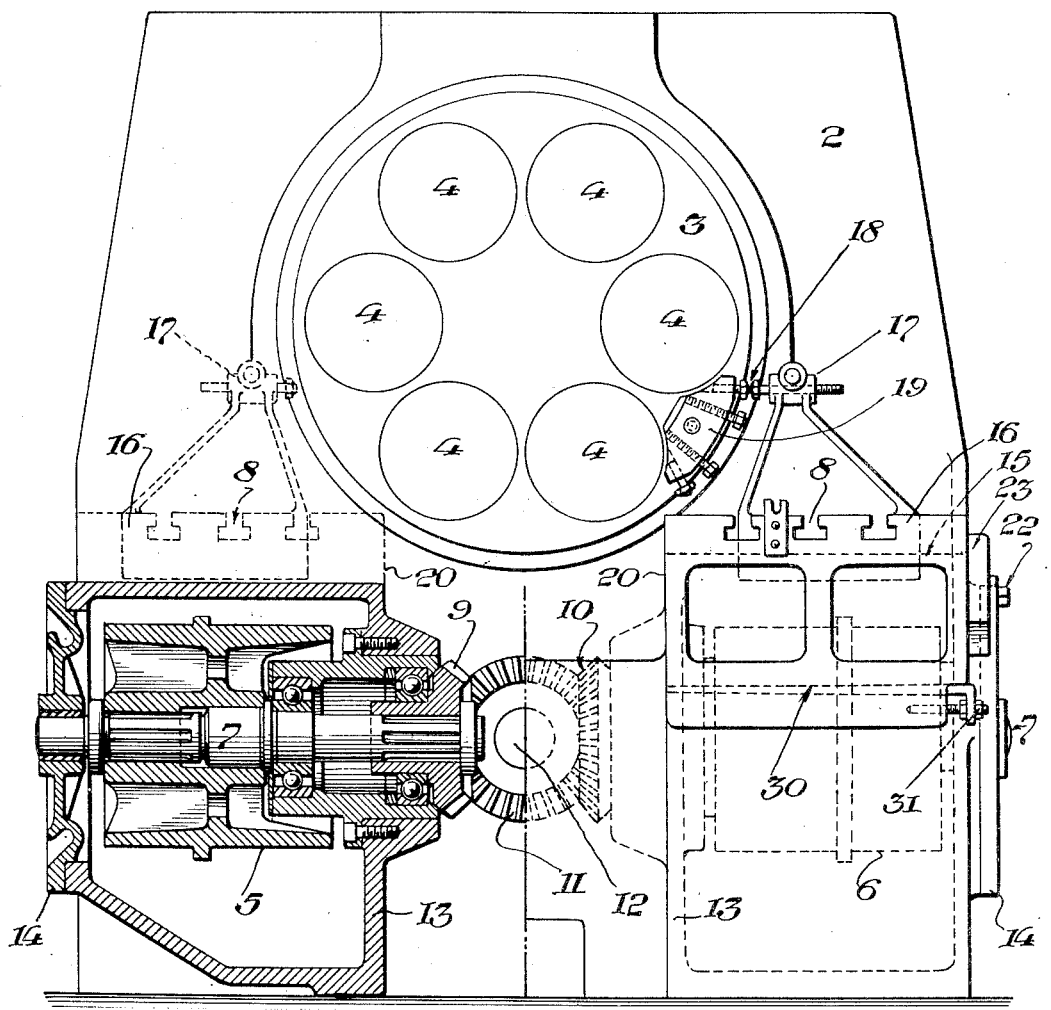

Before explaining in detail the present improvement and mode of operation thereof, I desire to have it understood that the invention is not limited to the details of construction and arrangement of parts which are illustrated in the accompanying drawings since the invention is capable of other embodiments, and that the phraseology which I employ is for the purpose of description and not of limitation.

In the machine illustrated, the work spindle housing 2 carries the indexible work spindle carrier 3 shown having six rotary work spindles 4, the carrier being indexed by suitable means, and reference is made to said patent for the various other units which co-operate with the indexible work spindle carrier to make a practical and operative machine.

In the present instance, the forming or cross slide mechanism is located with its cross slides in position on both sides of the machine to co-operate with the first and sixth rotary spindle. When, however, it is used with a four spindle machine, it would co-operate with the first and fourth spindles, it being understood, of course, that this improved cross slide mechanism may be used on any machne having one or more rotary work spindles.

The cross slides in the present instance are operated by cam drums 5 and 6 each mounted on a shaft 7 suitably supported by anti-friction bearings and carrying bevel gears 9 and 10 rotated by a bevel gear 11 mounted on the usual main cam shaft 12 of the machine and this operating means is shown located in extensions 13 of the spindle carrier housing. On the other ends of these extensions and supporting the outer ends of the cam drum shafts are covers 14 for the housings and secured thereto by screws.

Heretofore, it has been the practice to locate the axis of the cam drums directly under the cross slides practically in alignment with the longitudinal axis thereof and which, as illustrated in said patent referred to, require that the extensions of the spindle carrier housing in which these drums were located project sufficiently from the spindle carrier housing and toward the gear housing to house these drums and this, of course, materially reduced the chip room between the drum housing and also limited the width of the cross slides that it was possible to use.

In the present improvement however, it will be observed that the construction of the cross slide mechanism is such that the axis of the cam drums, instead of being directly under and in alignment with the longitudinal axis of the slides is located laterally or sidewise to the slide axis and at the inner side of the slides, thus materially increasing the chip room between the housings and also permitting the use of much wider slides.

To accomplish these important advantages, the slide supporting means shown as the spindle carrier housing extensions 13 having a hardened and inclined face, to each of which is bolted a hardened and ground steel dove-tailed guide plate 15 which is thus located angularly or inclinedly to the face of the spindle carrier housing.

Each cross slide 16 is formed straight on its top having the usual T-slots 8 to hold the tool holders and on the inner side is provided with a stop bracket 17 co-operating with stop screws 18 carried by a block 19 secured to the spindle carrier and by means of which the forward travel of the forming slides is accurately controlled. Each of these slides 16 has a depending or angularly located portion 20 so that the slide fits the dove-tailed guide plate 15 and is adjusted to such fit by means of a taper gib 30 and adjusting screw 31 (see Fig. 1). This gib controls the adjustment for all sides of the forming slide.

Inclinedly located with relation to the cam shaft and in the under dove-tailed face of the slide 16 is an adjusting plate 21, adjusted by means of a screw 22 carried by an end plate 23 secured to the slide 16. This adjusting plate 21 carries a roller 24 which contacts with a cam 25 on its cam drum 5 or 6 and this plate is held in fixed position in the slide 16 by means of an adjustable binding block 26 and binding screws 27 (see Fig. 2). By means of this adjustable binding block 26, the forming slide may be adjusted backward and forward relative thereto to permit the formation of the work to the proper depth or diameter without moving the cam on the cam drum.

From the foregoing, it will be observed that by the provision of the angular face on the slide supporting means shown as the spindle carrier housing extension, and the location of the co-operating angular portions of the cross slide, the slide will move forward and backward on the hardened plate 15 of the extension 13.

By reason of the present improvement in which the slide is supported inclined to the face of the spindle carrier housing, the slide can be made much wider so as to extend beyond the extension 13 without any such overhang as would occur in the commonly supported cross slides were they made wider than their supporting means and the construction is materially simplified, the cost reduced and a rigid and wide forming slide of triangular type is provided without in any way sacrificing chip room—in fact, materially increasing it while improving the operation of the forming slide considerably over previous types since the increased weight of the slide also very much assists in properly positioning it on the hardened guide plate fastened to the housing extension, increasing the rigidity of the forming slide over anything heretofore known and thus reduces to a minimum chattering and vibration of the tools carried thereby.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempt to set forth all of the forms in which it may be made or all of the modes of its use, I claim:

1. In a metal working machine, a cross slide mechanism comprising a slide having a straight top face for the reception of a tool and a depending portion and provided with means located inclinedly to said top face for shifting said slide, and a cam drum having its axis located laterally and inside of the longitudinal axis of said slide and parallel thereto for shifting said slide.

2. In a metal working machine having means for supporting a cross slide mechanism, a cross slide mounted on said means and having a width projecting beyond its supporting means, and means for operating said slide, said slide and operating means extending in the same direction transversely of the machine.

3. In a metal working machine having means for supporting a cross slide mechanism, a cross slide mounted on said means and having a width projecting beyond its supporting means, and means for operating said slide, said means located with its axis laterally and inside of the longitudinal axis of the cross slide and parallel thereto.

4. In a metal working machine having means for supporting a cross slide mechanism and provided with an inclined face, a cross slide having inclined means co-operating with said inclined face, and means for operating said slide and having its axis laterally of and inside the longitudinal axis of the cross slide and parallel thereto.

5. In a metal working machine having means for supporting a cross slide mechanism and provided with an inclined face, a cross slide mounted on said inclined face and having a width projecting beyond its supporting means, and means for operating said slide and having its axis located laterally of and inside the longitudinal axis of the cross slide and parallel thereto.

6. In a metal working machine having a spindle carrier housing and cross slide supporting means adjacent thereto and under the spindles, a cross slide mechanism comprising a cross slide mounted on said supporting means and having a width projecting therebeyond, and means for operating said slide, said slide and operating means extending in the same direction transversely of the machine.

7. In a metal working machine having a spindle carrier housing provided with an extension, a cross slide mechanism comprising a cross slide mounted on said extension and having a width projecting therebeyond, and means for operating said slide, said means located with its axis laterally of the longitudinal axis of the cross slide and parallel thereto.

8. In a metal working machine having a spindle carrier housing provided with an extension, a cross slide mechanism comprising a cross slide mounted on said extension and having a width projecting therebeyond, and means for operating said slide, said means located with its axis laterally and inside of the longitudinal axis of the cross slide and parallel thereto.

9. In a metal working machine having a spindle carrier housing and adjacent thereto and under the spindles a cross slide supporting means provided with an inclined hardened surface, a cross slide mechanism comprising a triangular cross slide, and means for shifting said slide and having its axis located laterally of and inside of the longitudinal axis of the cross slide and parallel thereto and including means co-operating with the slide and located in parallelism with and co-operating with said inclined hardened surface.

10. In a metal working machine having a spindle carrier extension provided with an inclined hardened surface, a cross slide mechanism comprising a triangular cross slide having a straight top face and adapted to project beyond the extension, and an inclined means co-operating with the hardened surface of the extension and a cam drum for shifting said slide and having its axis located laterally and inside of the longitudinal axis of the slide and parallel thereto.

11. In a metal working machine, a cross slide mechanism comprising a cross slide having a face, and rotatable means for operating it, the axis of said means being located laterally of the vertical plane of the longitudinal center of the face and substantially in the vertical plane of the inner side of the face.

12. In a metal working machine, a cross slide mechanism comprising a cross slide having a face, and rotatable means for operating it, the axis of said operating means being located substantially between the vertical plane of the inner side of the face and the longitudinal center of the face.

13. In a metal working machine, a cross slide mechanism comprising a cross slide having a face, and cam drum operating means for shifting said slide, the axis of said drum being located laterally of the vertical plane of the longitudinal center of the face and substantially in the vertical plane of the inner side of said face.

14. In a metal working machine, a cross slide mechanism comprising a cross slide, means located at an angle inclined to the top face of said slide for supporting it, and rotatable means having its axis located laterally of the vertical plane of the longitudinal center of the face for operating said slide.

15. A metal working machine having a housing provided with a lateral extension, a cross slide having a top and a depending portion overlapping the front face of said extension, means carried by the extension and located at an angle inclined to the top face of the slide for supporting it, and means for operating said slide.

16. A metal working machine having a housing provided with a lateral extension, a cross slide having a top and a depending portion overlapping the front face of said extension, means carried by the extension and located at an angle inclined to the top face of the slide for supporting it, and means for operating said slide and having its axis located laterally of the longitudinal axis of the top face of said slide.

17. A metal working machine having a housing provided with a lateral extension, a triangular cross slide having a top and a depending portion with its top face substantially parallel to the top face of said extension and its depending portion in front of and substantially parallel to the front face of said extension, and means carried by the extension for operating said slide.

18. A metal working machine having a housing provided with a lateral extension, a triangular cross slide having a top and a depending portion with its top face substantially parallel to the top face of said extension and its depending portion in front of and substantially parallel to the front face of said extension, and means carried by the extension for operating said slide, the longitudinal axis of said slide being substantially in line with the axis of the said operating means and the apex of said triangular slide.

19. A metal working machine having a housing provided with a lateral extension, a triangular cross slide having a top and a depending portion with its top face substantially parallel to the top face of said extension and its depending portion in front of and substantially parallel to the front face of said extension, and means carried by the extension for operating said slide, the apex of said slide being laterally beyond the vertical planes of the longitudinal axis of the slide and the axis of the operating means.

20. A metal working machine having a housing provided with a lateral extension, a triangular cross slide having a top and a depending portion with its top face substantially parallel to the top face of said extension and its depending portion in front of and substantially parallel to the front face of said extension, and means carried by the extension for operating said slide, the apex of said slide being laterally beyond the vertical planes of the longitudinal axis of the slide and the axis of the operating means, and the axis of the operating means located laterally of that of the slide.

21. A cross slide mechanism comprising a cross slide having a tool supporting face, a depending face, and a back slide face located at an angle to both of said faces, a slide support located between said faces at an angle to each and corresponding to the angle of the back face of the slide, and means for actuating said slide on its angular slide support.

22. A cross slide mechanism comprising a cross slide having a tool supporting face, a depending face, and a back slide face located at an angle to both of said faces, a slide support located between said faces at an angle to each and corresponding to the angle of the back face of the slide, and means for actuating said slide on its angular slide support, said actuating means having its axis laterally of the longitudinal axis of the angular back face and its slide support.

23. A cross slide mechanism comprising a cross slide having a tool supporting face, a depending face, and a back slide face located at an angle to both of said faces, a slide support located between said faces at an angle to each and corresponding to the angle of the back face of the slide, and means for actuating said slide on its angular slide support, said actuating means having its axis laterally of the longitudinal axis of the angular back face and its slide support and substantially in line with the inner side of the slide.

24. A metal working machine having a housing provided with a lateral extension, a cross slide having a top and a depending portion overlapping the front face of said extension, means carried by the extension and located at an angle inclined to this top face of the slide for supporting it, and means for operating said slide and having its axis located laterally of the longitudinal axis of the top face of said slide and substantially in the vertical plane of the inner side of the slide.

25. A metal working machine having a housing provided with a lateral extension, a triangular cross slide having a top and a depending portion with its top face substantially parallel to the top face of the extension and its depending portion in front of and subsequently parallel to the front face of said extension, and means carried by the extension for operating said slide and having its axis located laterally of the longitudinal axis of the slide.

26. A metal working machine having a housing providing with a lateral extension, a triangular cross slide having a top face and a depending portion with its top face substantially parallel to the top face of the extension and its depending portion in front of and substantially parallel to the front face of said extension, and means carried by the extension for operating said slide, the longitudinal axis of said slide being substantially in line with the axis of said operating means and the apex of said triangular slide.

27. A metal working machine having a housing provided with a lateral extension, a triangular cross slide having a top face and a depending portion with its top face substantially parallel to the top face of the extension and its depending portion in front of and substantially parallel to the front face of said extension, and means carried by the extension for operating said slide, the apex of said slide being laterally beyond the vertical plane of the longitudinal axis of the slide and the axis of the operating means.

28. A metal working machine having a housing provided with a lateral extension, a triangular cross slide having a top face and a depending portion with its top face substantially parallel to the top face of the extension and its depending portion in front of and substantially parallel to the front face of said extension, and means carried by the extension for operating said slide, the apex of said slide being laterally beyond the vertical plane of the longitudinal axis of the slide and the axis of the operating means with the axis of the operating means located laterally of that of the slide.

29. A metal working machine having a housing provided with a lateral extension having an inclined face at its upper outer corner, an inclined guide plate secured thereto, a cross slide having an inclined back face parallel to the inclined guide plate, and means for operating said slide.

30. A metal working machine having a housing provided with a lateral extension having an inclined face at its upper outer corner, an inclined guide plate secured thereto, a cross slide having an inclined back face parallel to the inclined guide plate, and means for operating said slide and located substantially in line with the inner side of said slide.

ALFRED E. DRISSNER.